United States Patent Office 3,576,763
Patented Apr. 27, 1971

3,576,763
ORGANIC VANADYL FLUORIDES AND THEIR USE IN COORDINATION CATALYSTS
Aaron Chung Liong Su, Wilmington, Del., assignor to E. I. du Pont de Nemours and Company, Wilmington, Del.
No Drawing. Original application June 10, 1966, Ser. No. 556,565, now Patent No. 3,455,974, dated July 15, 1969. Divided and this application Jan. 22, 1969, Ser. No. 822,762
Int. Cl. C08f 3/02
U.S. Cl. 252—431
5 Claims

ABSTRACT OF THE DISCLOSURE

Coordination catalysts for the polymerization of α-olefins are prepared by mixing an organoaluminum compound with a vanadyl compound having the formula:

$$R_2-X=O$$
$$\quad | \quad \quad |$$
$$R_1 \quad F$$

wherein $R_1$ and $R_2$ are alkoxy groups, $$(R_7COCH=\overset{R_8}{\underset{|}{C}}-O)$$

wherein $R_7$ and $R_8$ are lower alkyl, aryl or taken together, lower alkylene, or $R_1$ and $R_2$ taken together are an α,ω-alkylene dioxy group.

---

This application is a divisional of copending application Ser. No. 556,565 filed June 10, 1966, now U.S. Pat. No. 3,455,974.

This invention relates to novel organic-soluble alkoxy vanadyl fluorides, to methods of preparing the same and to their use in the coordination catalyzed polymerization of α-olefins.

In general the known fluorine-containing compounds of vanadium are ionic in character and are not soluble in organic solvents. Such compounds have not heretofore been suitable for the preparation of organo-soluble coordination catalysts which are preferred for the preparation of elastomeric copolymers of α-olefins.

A new class of compounds has now been discovered which are fluorine containing vanadyl compounds which are soluble in many aprotic organic solvents. One group of such compounds is described by the formula:

$$R_2-X=O$$
$$\quad | \quad \quad |$$
$$R_1 \quad F$$

wherein $R_1$ and $R_2$ are alkoxy radicals or β-acyl ketonate radicals or collectively $R_1$ and $R_2$ can be an α,ω-alkylene dioxy radical. The compounds can have from 2 to 40 carbon atoms but preferably have from 2 to 10 carbon atoms in the molecule.

Valuable coordination catalysts can be made by mixing at least 2 moles of an organo aluminum compound with 1 mole of the soluble vanadyl fluoride compounds of the present invention.

The above compounds can be made by the following methods:

(a) By the metathetical reactions of 2 molar proportions of a compound having the formula:

$$R_4R_5R_6VO$$

wherein $R_4$, $R_5$ and $R_6$ are alkoxy radicals or $R_4$ and $R_5$ are collectively an α,ω-alkylene dioxy radical. $R_4$ and $R_5$ can have collectively from 2 to 40 and preferably from 2 to 10 carbon atoms, and $R_6$ is a lower alkoxy radical; with 1 molar proportion of vanadyl trifluoride in an inert organic solvent at about ambient temperature. A variety of products can be obtained by this method. Thus when $R_4R_5R_6VO$ is a trialkoxy compound, the reaction yields a solution of the dialkoxy vanadyl monofluoride according to the equation:

$$2VO(OR)_3 + VOF_3 = 3VO(OR)_2F$$

wherein R is an alkyl radical.

The product of the reaction is soluble in the preferred solvents whereas vanadyl fluoride is insoluble. Accordingly the progress of the reaction is marked by the disappearance of the insoluble vanadyl fluoride.

The cyclic orthovanadates i.e., where $R_4$ and $R_5$ are collectively an α,ω-alkylenedioxy radical can be made by a similar reaction. For example neopentylenedioxy vanadyl fluoride can be prepared by the reaction:

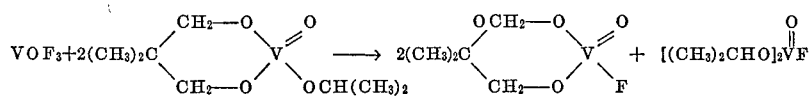

The cyclic orthovanadates can in turn be prepared by reacting the appropriate glycol with an acyclic orthovanadate of a more volatile alcohol, e.g.

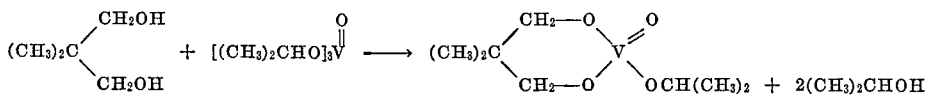

The resulting alcohol is removed by azeotropic distillation or by vacuum distillation from the mixture.

(b) By the reaction of vanadyl trifluoride with an alkylene glycol or α,β-diketone or a metal salt of a β-diketone, in the presence of an inert organic solvent at about ambient temperatures and removing the hydrogen fluoride formed.

One method of removing hydrogen fluoride is by vacuum stripping of the reaction mixture or by sparging with an inert gas such as nitrogen. A preferred method is to conduct the reactives in the presence of anhydrous sodium fluoride or potassium fluoride which removes the hydrogen fluoride by forming a double salt $MHF_2$ wherein M is Na or K.

This reaction always produces the monofluorovanadium compound regardless of the proportion of reactants employed.

The reactions can be represented by the following equation:

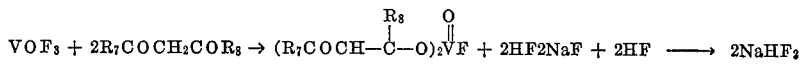

$R_7$ and $R_8$ are lower alkyl or aryl or taken together lower alkylene

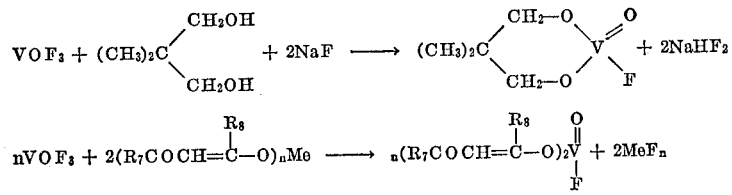

Where Me is a metal of valence $n$, such as iron, vanadium or aluminum.

(c) Valuable soluble fluorine containing vanadyl compounds can also be made by mixing one molar proportion of $VOF_3$ with at least two molar proportions of a dialkoxy vanadyl chloride in an inert organic solvent at about ambient temperature. The reaction is believed to be

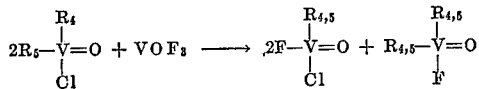

however the chlorofluoro compounds have not been isolated and identified with certainty. The reaction product contains both fluorine containing vanadyl compounds in solution, and is useful for the preparation of coordination catalysts.

A wide variety of aprotic solvents can be employed in the manufacture of the novel soluble fluorine-containing vanadium compounds, and as a solvents for the formation of coordination catalysts and the subsequent polymerization of α-olefins with such catalysts. Preferred solvents are aliphatic hydrocarbons, including branched hydrocarbons having from 5 to 10 carbon atoms, cycloaliphatic hydrocarbons such as cyclohexane, benzene hydrocarbons such as benzene, toluene, xylene and the like, and halogenated hydrocarbons such as tetrachloroethylene, methylene dichloride, monochlorobenzene, dichlorobenzene and the like. The chemical nature of the solvent is not important, but the solvent should be convenient to handle for the selected use and should be free of active hydrogen or other groups which could react with the reactants or products described hereinabove.

The reaction to form soluble vanadyl fluoride compounds can be conducted conveniently at room tempearture, but higher or lower temperatures can be employed. The preferred range of temperature is from about 0° C. to about 70° C. If desired the compounds can be isolated from the solvent by distillation, preferably under vacuum and preferably at low temperature and in some cases by crystallization. It has been found that in general the soluble vanadyl fluoride compounds are less stable to temperature than their solutions. The chelated compounds (i.e. those having an α,ω-alkylene dioxy substituent) are much more stable than the unchelated alkoxy species.

Since the soluble vanadyl fluoride compounds are readily hydrolyzed by water, it is essential to exclude moisture during their preparation and storage. Oxygen should also be excluded, particularly when these materials are employed to form coordination catalysts, since otherwise the activity of the catalysts is diminished. The conventional inert gases can be employed to provide an inert atmosphere over the solution. Nitrogen is typical and is preferred.

As has been stated hereinabove, valuable coordination catalysts can be made by mixing at least 2 moles of a diorgano aluminum chloride or bromide with one mole of the organo-soluble vanadyl fluoride compounds of the present invention.

The upper limit to the amount of the organoaluminum compound is not critical, 100 moles of the organoaluminum compound per mole of the organo-soluble vanadyl fluoride can be employed. The preferred range is from about 10 to about 50 moles of the diorganoaluminum compound per mole of the organo-soluble vanadyl fluoride compound. The order of addition is not critical; the addition may take place in the presence or absence of monomers, the former method, which gives higher yields, being preferred. The coordination catalyst can be prepared and used in the media which are familiar to those skilled in the coordination catalyst art. Tetrachloroethylene and hexane are representative examples.

The organo aluminum compounds that can be employed as co-catalysts are those customarily employed in the manufacture of coordination catalysts. Preferred compounds can be represented by the formula:

$$R_9R_{10}R_{11}Al$$

in which $R_9$, $R_{10}$ and $R_{11}$ can be $C_2$ to $C_6$ alkyl, chlorine or bromine, with the proviso that at least one of $R_9$, $R_{10}$ and $R_{11}$ is an alkyl group. Particularly preferred compounds are the dialkyl aluminum chlorides such as diisobutyl aluminum chloride. Mixtures of aluminum compounds can be employed if desired.

The coordination catalyst is frequently used at room temperature but may, when desired, be employed at higher or lower temperatures. The life of the catalyst is longer at lower temperatures; shorter at higher temperatures.

The new vanadium compounds of the present invention, and the catalysts made therefrom are organo-soluble in contrast to other fluorine containing vanadium compounds. The vanadium-fluorine bond appears to be appreciably more stable than the vanadium-chlorine bond and, in general the fluorine containing vanadium compounds are more stable to hydrolysis and to oxidation than the corresponding chlorine compounds. For example, the compound

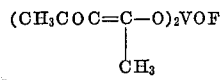

is a crystalline solid which can be exposed to air at room temperature without change for several days. By contrast the chlorine analog is readily oxidized and hydrolysed so that preparation and retention of a pure sample is difficult.

This invention is further illustrated by the following specific examples which should not, however, be construed as fully delineating the scope thereof.

EXAMPLES

Examples 1–5.—General procedure for preparation of organic soluble alkoxy vanadyl fluorides Inside a dry box 0.62 g. (0.005 mole) of vanadyl trifluoride was weighed and put into a 125-ml. Erlenmeyer flask fitted with a three-way stopcock and containing a magnetic stirring bar. The flask, tightly stoppered, was removed from the dry box. Under a nitrogen stream 39 ml. of hexane and 6 ml. of a 50% solution of triisopropyl orthovanadate in heptane (0.010 gram-mole) were introduced successively into the flask from a hypodermic syringe. The mixture was stirred at room temperature. The vanadyl trifluoride, which is insoluble in non-polar solvents, interacted heterogeneously with the alkyl orthovanadate to give the dialkoxy vanadyl fluoride which is very soluble in non-polar solvents. The completion of reaction was indicated by the disappearance of vanadyl trifluoride from the reaction mixture and the formation of a brown, yellowish solution.

When triisopropyl orthovanadate was employed, hexane was used as the solvent; the formation of diisopropyl vanadyl fluoride was complete in less than two minutes.

When methyl or ethyl orthovanadate were employed, the reaction took place best when benzene was employed as the solvent.

General procedure for the formation of the coordination catalyst in the presence of monomers; preparation of ethylene/propylene/1,4-hexadiene tripolymer with said catalyst The reactor was a 2-liter 4-neck resin kettle fitted with a thermometer, a mechanical stirrer, a gas inlet and a gas outlet device.

One liter of tetrachloroethylene was introduced into the above reactor at 25° C. and saturated with a mixture of dry ethylene and propylene supplied at the respective rates of 1 l./min. and 3.2 l./min. While monomer inflow and agitation continued as before, 0.01 gram-mole of diisobutyl aluminum monochloride, 0.05 gram-mole of 1,4-hexadiene and 0.001 gram-mole of diisopropoxy vanadyl monofluoride were introduced in turn. The resulting mixture was stirred while the temperature was maintained at 25° C. Aliquots of the polymer solution were withdrawn at 10-minute intervals with a hypodermic syringe, deactivated with methanol, and concentrated to constant weights for use in reaction rate study. After one hour, the polymerization was terminated by deactivating the catalyst with methanol. After monomer flow had been stopped, the copolymer was precipitated by treating the tetrachloroethylene solution with a large quantity of methanol. A 32-g. yield of ethylene/propylene/1,4-hexadiene copolymer was obtained displaying an inherent viscosity of 1.31 (determined on a 0.1% solution in tetrachloroethylene at 30° C.).

Diisobutyl aluminum monochloride was generally added as a 1-molar solution in tetrachloroethylene. The diisopropoxy vanadyl fluoride was added as a hexane solution (3 ml. supplying 0.001 gram-mole).

If the catalyst were premixed for 60 seconds in the absence of monomers instead of being made in the presence of monomers, the yield of the tripolymer obtained by the above procedure was decreased by about one-third.

The specific compounds, conditions, and results obtained in Examples 1–5 are given in Table I.

Example 6

49.2 milliliters of a hexane solution containing 10 mmoles of freshly prepared diisopropoxy vanadyl chloride was added at 25° C. under a nitrogen atmosphere to 5 mmoles (0.62 g.) of vanadyl trifluoride in a 125-ml. Erlenmeyer flash fitted with a three-way stopcock and containing a magnetic stirring bar. The solid vanadyl trifluoride disappeared, after a few minutes agitation, to give an orange-yellow solution.

An aliquot containing 1 mmol of vanadium was immediately removed and used as a coordination catalyst component in accordance with the general procedure of Example 1. The following data were obtained.

| Polymerization time: | E/P/1,4-HD-copolymer (g./25 ml.) |
|---|---|
| 10 | 0.25 |
| 20 | 0.38 |
| 30 | 0.481 |
| 40 | 0.571 |
| 50 | 0.657 |
| 60 | 0.724 |

Example 7.—Preparation of isopropyl-(2,2-dimethyl-1,3-propylene) orthovanadate from neopentyl glycol Under a nitrogen atmosphere 200 ml. of n-hexane and 24 ml. of a 50% solution of triisopropyl orthovanadate in n-heptane (0.04 gram-mole) were added with stirring to 4.16 g. (0.04 gram-mole) of neopentyl glycol in a round-bottom glass flask. The neopentyl glycol, which is only very slightly soluble in hexane, disappeared quickly. The resulting clear, brown, liquid composition was concentrated at 70° C. to a 100-ml. volume, diluted again to 200-ml. volume with hexane, and boiled down again to 100 ml. After being thrice concentrated this way, the solution was finally diluted to a 200 ml. volume with hexane.

Preparation of 2,2-dimethyl-1,3-propylenedioxy vanadyl fluoride

A 100-ml. portion of the orthovanadate solution prepared above (containing 0.02 gram-atom vanadium) was added to 1.24 g. (0.01 gram-mole) of vanadyl trifluoride under nitrogen. When the mixture was stirred an appreciable amount of the latter dissolved, followed by gradual formation of a yellowish-orange solid which adhered to the walls of the reaction vessel. Finally, a 2-ml. portion of a 50% solution of triisopropyl orthovanadate in n-heptane was introduced in order to destroy any excess vanadyl TABLE I.—PREPARATION OF VANADIUM ALKOXY FLUORIDES AND USE IN POLYMERIZATION OF OLEFINS (a) Preparation of vanadium alkoxy fluorides

| | Reactants | | Solvent | | Vanadium Alkoxy Fluoride Product | |
|---|---|---|---|---|---|---|
| Example | $VOF_3$ mmole | Alkoxy compound | mmole | Type | ml. | Type | mmole |
| 1 | 5 | $VO(O\text{-}nBu)_3$ | 10 | Tetrachloroethylene | 43.9 | $VO(O\text{-}nBu)_2F$ | 15 |
| 2 | 5 | $VO(O\text{-}isoPr)_3$ | 10 | Hexane | 50 | $VO(O\text{-}isoPr)_2F$ | 15 |
| 3 | 5 | $VO(O\text{-}Et)_3$ | 10 | ...do... | 50 | $VO(O\text{-}Et)_2F$ | 15 |
| 4 | 5 | $VO(O\text{-}isoPr)_2Cl$ | 10 | {Tetrachloroethylene... 33.3 / Hexane... 16} | | {$2VO(O\text{-}isoPr)FCl$ plus $VO(O\text{-}isoPr)_2F$} | {10 / 5} |
| 5 | 5 | $VO(OMe)_3$ | 10 | Benzene | 200 | $VO(OMe)_2F$ | 15 |

(b) Copolymerization of ethylene, propylene and 1,4-hexadiene using coordination catalyst of 0.001 mole vanadium alkoxy fluoride plus 0.010 mole diisobutyl aluminum chloride 1 liter of tetrachloroethylene as solvent, 25° C. Polymerization for 60 minutes. Ethylene added at 1 liter/min. Propylene 3.2 liter/min.; 1,4-hexadiene 0.05 gram mole.

| | | Polymeric | | Product | |
|---|---|---|---|---|---|
| Example | Vanadium catalyst component | Yield, gm. | $[\eta]_{inh}$ | Weight percent propylene | Weight percent 1,4-hexadiene |
| 1 | $VO(O\text{-}nBu)_2F$ | 25 | 1.36 | 42 | 3 |
| 2 | $VO(O\text{-}isoPr)_2F$ | 32 | 1.31 | 53 | 2 |
| 3 | $VO(O\text{-}Et)_2F$ | 33 | 1.31 | 50 | 3.5 |
| 4 | $2VO(O\text{-}isoPr)FCl$ plus $VO(O\text{-}isoPr)_2F$ | 29 | | | |
| 5 | $VO(OMe)_2F$ | 29 | | | | trifluoride. The mixture was filtered and the product residue washed six times with n-hexane and dried for three hours at 0.1 mm. Hg vacuum.

*Analysis.*—Calculated (percent): Carbon, 31.9; hydrogen, 5.31; vanadium, 27.1. Found (percent): Carbon, 32.7; hydrogen, 5.5; vanadium, 27.1.

Preparation of ethylene copolymers in the presence of a coordination catalyst made from diisobutyl aluminum monochloride and 2,2 - dimethyl - 1,3 - propylenedioxy vanadyl fluoride (A) An ethylene/propylene/1,4-hexadiene copolymer was prepared in accordance with the general procedure described in Example 1 except for the following changes: The coordination catalyst was formed by introducing 0.01 gram-mole of diisobutyl aluminum monochloride and .001 gram-mole of 2,2 - dimethyl - 1,3 - propylenedioxy vanadyl fluoride prepared above (introduced as a solution in 6 ml. of methylene chloride). The yield of copolymer after 60 minutes polymerization time was 0.288 g./25 ml.

(B) The procedure of Part A was repeated except that 1,4-hexadiene was omitted. The yield of ethylene/propylene copolymer after 60 minutes polymerization time was 0.623 g./25 ml.

Example 8.—Preparation of fluoro vanadyl bis(acetylacetonate)

A 2.06 ml. (0.020 gram-mole) portion of acetylacetone was added from a hypodermic syringe to an agitated suspension of 1.24 g. (0.010 gram-mole) of vanadyl trifluoride in 250 ml. of benzene at room temperature (25° C.). An intense purple-blue color appeared instantaneously. The agitated mixture was then concentrated by boiling while being swept with a slow stream of nitrogen; the vapor was acidic indicating HF. When about 200 ml. of solution remained, the temperature was lowered below the boiling point and about 1 g. of sodium fluoride introduced. For 5 minutes the mixture was vigorously stirred. Disappearance of almost all of the vanadyl trifluoride indicated the reaction was essentially complete. Fluoro vanadyl bis (acetylacetonate) was then isolated by concentrating the solution to about 60 ml. and slowly adding hexane to the boiling solution until small particles of solid appeared (about 75 ml. of hexane were needed). After the mixture had been cooled at room temperature, large glittering crystals formed. The liquid was decanted and the crystals washed with 5:1-hexane:benzene mixture.

*Analysis.*—Calculated (percent): Carbon, 42.3; hydrogen, 4.9; fluorine, 6.7; vanadium, 18. Found (percent): Carbon, 42.3, 42.0; hydrogen, 5.2, 4.9; fluorine, 6.7, 6.4; vanadium, 18.4, 18.4.

Preparation of ethylene/propylene copolymer in the presence of a coordination catalyst made from isobutyl aluminum monochloride and fluoro vanadyl bis(acetylacetonate)

Ethylene, propylene, and 1,4-hexadiene were copolymerized in tetrachloroethylene at 25° C. in the presence of a coordination catalyst made by combining 0.005 gram-mole of diisobutyl aluminum monochloride (in solution in tetrachloroethylene) and 0.0005 gram-mole of fluoro vanadyl bis(acetylacetonate) (10 ml. of a solution made by dissolving 0.541 g., 1.92 gram-moles, in 38.4 ml. of methylene chloride). The general procedure of Example 1 was employed. The following data were obtained.

| Time (minutes): | Grams copolymer/25 milliliters reaction solution |
|---|---|
| 10 | 0.272 |
| 20 | 0.372 |
| 30 | 0.421 |
| 40 | 0.478 |
| 50 | 0.518 |
| 60 | 0.558 |

The remainder of the solution was concentrated to yield 21 g. of copolymer having an inherent viscosity of 1.7 and analyzing for 49% (by weight) propylene and 3.4% (by weight) 1,4-hexadiene.

The above procedure was repeated except that the temperature was 0° C. The following data were obtained.

| Time (minutes): | Grams copolymer/25 milliliters reaction solution |
|---|---|
| 10 | 0.187 |
| 20 | 0.402 |
| 30 | 0.571 |
| 40 | 0.677 |
| 50 | 0.748 |

The residual copolymers solution when concentrated gave 36 g. of product.

Example 9.—Preparation of diethoxy vanadyl fluoride

A 1.86-g. (0.015 gram-mole) portion of vanadyl trifluoride was weighed in a dry box and suspended in 70 ml. of benzene at 27° C. When 14.22 ml. (0.030 gram-mole) of a 50% (weight/volume) triethoxy orthovanadate solution in heptane had been added, the temperature rose to 30° C. In about 5–10 minutes the vanadyl trifluoride dissolved completely giving an intensely dark brown-green solution.

Preparation of premixed catalyst from diisobutyl aluminum monochloride and diethoxy vanadyl fluoride A coordination catalyst was prepared by adding 0.002 gram-mole of diethoxy vanadyl fluoride (3.74 ml. of the solution prepared above) to 0.020 gram-mole of diisobutyl aluminum monochloride (in the form of a 1-molar solution in tetrachloroethylene) at about 25° C. The resulting catalyst mixture was agitated for about 60 seconds.

Preparation of ethylene/propylene/1,4-hexadiene copolymer with premixed catalyst At the end of the 60-second agitation period described above, a 11.87-ml. portion of the coordination catalyst mixture (containing 0.001 gram-mole of vanadium and 0.010 gram-mole of aluminum) was introduced into an agitated resin kettle containing 1 liter of tetrachloroethylene, 0.05 gram-mole 1,4-hexadiene, and saturation concentrations of ethylene and propylene monomers. The copolymerization reaction was carried out for 60 minutes at ambient temperature (about 25° C.) while ethylene and propylene gases were supplied at 1 l./min, and 3.2 l./min., respectively. The ethylene/propylene/1,4-hexadiene tripolymer, isolated by precipitation with methanol, weighed about 22 g.

Preparation of ethylene/propylene/1,4-hexadiene tripolymer with diethoxy vanadyl fluoride/diisobutyl aluminum monochloride coordination catalyst prepared in situ The copolymerization experiment described above was repeated except that the coordination catalyst was made in situ by introducing into the monomer solution in turn diisobutyl aluminum monochloride and diethoxy vanadyl fluoride. The yield of tripolymer was 35 g.

Example 10.—Preparation of dibutoxy vanadyl fluoride from vanadyl trifluoride and tributyl orthovanadate A 4.2-g. portion of impure vanadyl trifluoride (0.0339 gram-mole) was allowed to interact with 46.2 ml. of heptane solution at 25° C. containing 19.4 g. of tri n-butyl orthovanadate (0.0678 gram-mole). The heptane solution became intensely colored; appreciable quantity of heat was generated. The resulting mixture was diluted to approximately 270 ml. with chlorobenzene while agitated.

The solution prepared above was greenish-brown colored. An appreciable amount of black solid was observed which did not dissolve even after stirring overnight.

Copolymerization of ethylene/propylene/1,4-hexadiene in the presence of a coordination catalyst made in situ from diisobutyl aluminum monochloride and di n-butoxy vanadyl fluoride The apparatus and procedure described in general directions given above before Example 1 were employed. The resin kettle reactor contained 1 l. of tetrachloroethylene at 25° C. and 0.008 gram-mole of 1,4-hexadiene. Ethylene and propylene were continually introduced at the respective rates of 1 l./min. and 3.2 l./min. When the tetrachloroethylene solution had become saturated with ethylene and propylene, the coordination catalyst was formed in situ by successive addition of 0.010 gram-mole of diisobutyl aluminum monochloride and approximately 0.0001 gram-mole of the di n-butoxy vanadyl fluoride prepared above (2.7 ml.). The copolymerization was carried out for 80 minutes at 25° C. Aliquots were removed approximately every 10 minutes and dried to constant weight to give the amount of copolymer formed. The following data were obtained:

| Time (mins.) | Volume (ml.) | Copolymer wt. in vol. (g.) | Wt. (g.)/25 ml. |
|---|---|---|---|
| 10 | 22 | 0.213 | 0.242 |
| 20 | 21.7 | 0.329 | 0.379 |
| 30 | 24.8 | 0.459 | 0.463 |
| 41.1 | 21.3 | 0.456 | 0.535 |
| 40 | 20 | 0.503 | 0.628 |
| 60.3 | 22 | 0.576 | 0.654 |
| 70 | 22.8 | 0 626 | 0.686 |
| 80 | 23 | 0.687 | 0.746 |

The tripolymer obtained from the rest of the reaction mixture after the catalyst had been destroyed after 80 minutes time and methanol had been used to precipitate the product, analyzed for 43% propylene monomer units and 34.4% 1,4-hexadiene monomer units by weight.

As many apparently widely differing embodiments of this invention may be made without departing from the spirit and scope thereof, it is to be understood that this invention is not to be limited to the specific embodiments thereof except as described in the appended claims.

What is claimed is:

1. A coordination catalyst for the ploymerization of α-olefins consisting essentially of the product prepared by mixing in an inert solvent in the absence of oxygen (1) a vanadyl compound having 2 to 40 carbon atoms of the formula

wherein $R_1$ and $R_2$ are alkoxy groups,

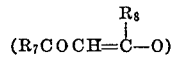

wherein $R_7$ and $R_8$ are lower alkyl, aryl or taken together, lower alkylene or $R_1$ and $R_2$ are joined together to form an α,ω-alkylene dioxy group with (2) about 2–100 moles per mole of said vanadyl compound of an organo aluminum compound of the formula

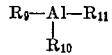

wherein $R_9$, $R_{10}$ and $R_{11}$ are independently $C_2$–$C_6$ alkyl, chlorine or bromine, with the proviso that at least one of $R_9$, $R_{10}$ or $R_{11}$ is an alkyl group.

2. A catalyst of claim 1 wherein the vanadyl compound contains from 2 to 10 carbon atoms.

3. A catalyst of claim 1 wherein the organo-aluminum compound is a dialkylaluminum chloride.

4. Composition of claim 1 where said fluorine containing vanadyl compound is diethoxy vanadyl fluoride.

5. Composition of claim 1 in which said organo aluminum co-catalyst is diisobutyl aluminum chloride.

References Cited
UNITED STATES PATENTS 3,396,155    8/1968    Delboville et al. ___ 252—431UX
3,468,817    9/1969    Hsieh _____ 252—431X PATRICK P. GARVIN, Primary Examiner U.S. Cl. X.R.

252—429; 260—88.2, 93.7, 94.3, 94.9